United States Patent [19]
Mahon et al.

[11] 4,020,625
[45] May 3, 1977

[54] EXPANDED SCALE TIMER

[75] Inventors: Joseph J. Mahon, Libertyville;
William Redfield, Lake Forest;
Ignacy Supel, Chicago, all of Ill.

[73] Assignee: The Singer Company, New York, N.Y.

[22] Filed: Jan. 2, 1976

[21] Appl. No.: 646,384

[52] U.S. Cl. .............................. 58/21.13; 58/38 R; 58/38 A; 58/9
[51] Int. Cl.$^2$ .......................................... G04F 3/02
[58] Field of Search ............ 58/21.1, 16 R, 9, 38 R, 58/38 A, 34, 21.13, 22.9, 85.5, 125 C; 200/38 R, 38 A, 38 FA; 74/3.54, 3.56; 340/392, 393, 402, 384 E, 407, 327; 235/144 R, 144 SM

[56] References Cited
UNITED STATES PATENTS

| | | | |
|---|---|---|---|
| 1,934,387 | 11/1933 | Tweedale | 340/393 X |
| 1,982,495 | 11/1934 | Browning | 58/85.5 X |
| 2,027,531 | 1/1936 | Hammond | 340/393 X |
| 2,261,723 | 11/1941 | Hoffman | 58/21.13 |
| 2,303,365 | 12/1942 | Karlsen | 58/85.5 X |
| 2,565,017 | 8/1951 | Brown | 58/21.13 |
| 2,610,683 | 9/1952 | Beiser | 58/22.9 |
| 3,492,807 | 2/1970 | Kohlhagen | 58/34 X |
| 3,941,000 | 3/1976 | Allison | 58/21.1 X |

Primary Examiner—Ulysses Weldon
Attorney, Agent, or Firm—Michael, Best & Friedrich

[57] ABSTRACT

The timer motor drives a non-circular drive gear fixed on the same shaft as the final gear of the reduction gear train. The final gear is driven by a pinion which is mounted on an axially movable spring loaded jackshaft on which a large gear is mounted with clutch members on the pinion and large gear. When the timer is set the shaft carrying the driven non-circular gear and cam is depressed causing the cam face to depress the jackshaft to disengage the clutch permitting easy rotation of the cam to the desired starting point. The angular motion of the driven non-circular gear and cam is substantially logarithmic with the angular motion increasing as "zero" is approached. When the timer is set the switch is closed to start the motor and the timed device. The lever carrying the cam follower is spring loaded to urge the follower against the cam and to take up the motion in the pin and slot pivot for the lever. When the follower drops into the notch at zero the lever pivots rapidly, hits the fixed stop and pivots about the stop using the motion in the pin and slot. This lets the striker end of the lever hit the bell and then the lever bias spring again takes up the motion to pull the lever off the bell and let the bell "ring" while the fixed stop holds the lever off the bell. The follower is pivoted so during the initial set motion it moves to present an incline to the cam allowing the cam to push the follower out of the notch.

10 Claims, 7 Drawing Figures

EXPANDED SCALE TIMER

BACKGROUND OF THE INVENTION

In timing certain operations it is necessary to provide reasonably accurate timing for short and long intervals. An example of such a requirement would be a microwave oven where the cycle time may be as short as ten seconds or as long as 35 minutes. With the usual timer arrangement having a linear-type dial, i.e. equal angular movement in equal time periods, setting an interval as short as ten seconds in a dial having 35-minute capacity becomes a near impossibility. Various solutions have been proposed to overcome this type of an arrangement. One such solution is a digital counter employing counter wheels. This type of counter is expensive. Another solution would be to provide two timers, one for the full 35 minutes and the other for a 5-minute program. Another solution employs the use of non-circular gearing causing the long time settings to be compressed while expanding the short time settings. A difficulty in such an arrangement is the high manual torque required to set the timer due to the high adverse gear ratios encountered with the non-circular gearing coupled with the drag of the gear reduction from the motor. A friction clutch in the reduction gearing does not overcome the objection.

Timers such as are used in this type of appliance customarily are provided with a bell to signal the end of the timing cycle. Bell ringing requires an impact on the bell and immediate withdrawal of the striker so the bell will ring rather than be damped and give a dead sound. The usual solution in the past has been to mount the striker on the end of a cantilevered spring which at the rest position would be spaced slightly from the bell. If this spacing gets too great, insufficient impact is obtained and the bell is weak sounding. As the spacing is decreased the criticality of adjustment increases and this directly results in higher cost manufacture.

In order to obtain a good strike action on the bell it is necessary that the cam follower which actuates the striker move with a snap action but this in prior designs has resulted in too high a torque to manually drive the timer out of the zero position. The very geometry which gives the snap action worked directly against easy movement out of the zero position.

SUMMARY OF THE INVENTION

In order to reduce the torque required during manual setting of this timer a mechanical clutch is provided to disengage the major portion of the reduction gearing during the manual setting operation. The structure involved in this is extremely simple and involves a minimum of extra parts.

In order to obtain a good strike action on the bell the striker is made part of the lever which carries the cam follower and this lever is made to normally pivot about a pivot connection which provides some motion which is normally blocked by the spring which biases the lever to hold the follower against the timing cam. When the cam follower drops into the notch at the zero position the momentum coupled with the lever impacting on a stop causes the lever to now pivot about the stop within the range of movement afforded by the pin and slot connection. This permits the lever to over-travel and the striker to hit the bell but the biasing spring immediately returns the lever to a position in which the striker is properly spaced from the bell thus allowing the bell to ring clearly.

In order to drive the follower out of the zero position the follower is pivoted on the lever and when the cam is manually reversed to move out of zero the follower can move to a position in which it provides an inclined surface for the edge of the notch to work against and thus allow the lever to be ramped easily out of the zero position. Therefore, the cam and follower can be shaped to maximize the snap drop without impairing the ability to reset.

DESCRIPTION OF THE PREFERRED EMBODIMENT

Figure 2:
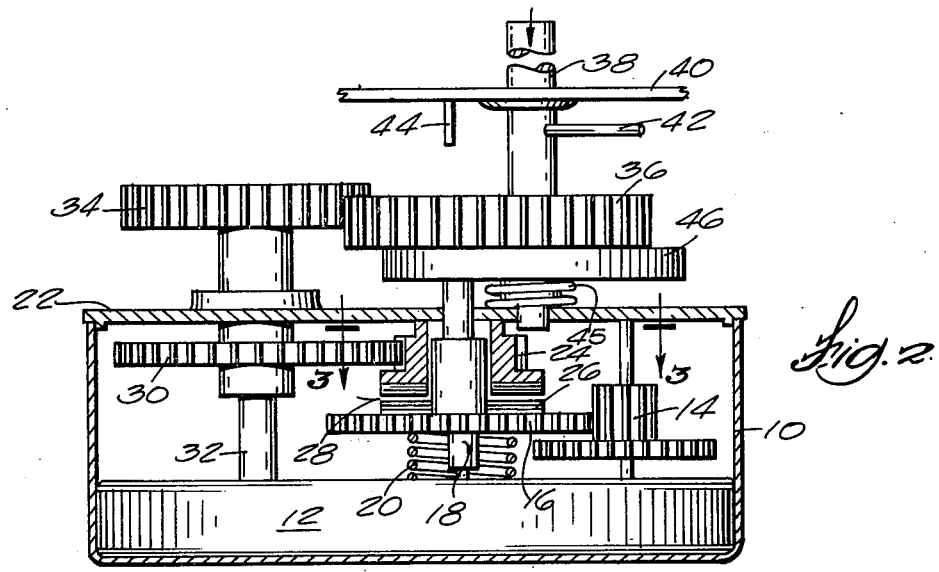
FIG. 2 is similar to FIG. 1 but shows the clutch disengaged upon inward manual movement of the shaft.
Figure 3:
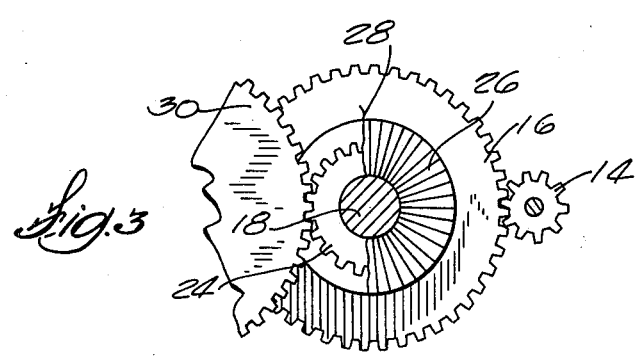
FIG. 3 is a fragmentary plan view of the gearing.

Case 10 encloses a motor 12 and the reduction gearing, only a portion of which is depicted in the drawings. The reduction gearing has a pinion 14 driving the large gear 16 fixed on the axially movable jackshaft 18 which is biased upwardly by spring 20 to hold the enlarged portion of the jackshaft against the underside of cover plate 22. An intermediate pinion 24 is rotatably mounted on the enlarged portion of the jackshaft. Face splines 26 on the confronting surfaces of the pinion 24 and gear 16 make up a clutch 28 which is normally engaged by the bias of spring 20 so pinion 24 and gear 16 rotate in unison. If the jackshaft 18 is moved downwardly against the bias of spring 20, the clutch 28 is disengaged (as shown in FIG. 2) and gear 24 will remain engaged with the final gear 30 mounted on shaft 32 which extends through the cover 22 and has the non-circular drive gear 34 on its outer end. Gear 34 drives another non-circular gear 36 which is mounted on shaft 38 journaled in the cover 22 and in bracket 40 for rotational movement and for axial movement. The outer end of the shaft is normally provided with a knob for manual actuation. Rotation of the shaft 38 is limited to somewhat less than 360° by pin 42 fixed in the shaft and engageable with the post 44 depending from bracket 40. The pin additionally limits outward movement of the shaft 38 under influence of biasing spring 45 compressed between the casing cover 22 and the underside of cam 46 fixed on shaft 38 for rotation with gear 36. When the shaft 38 is pushed downwardly as in FIG. 2 the underside of cam 46 pushes the jackshaft down to disengage clutch 28.

Figure 5:
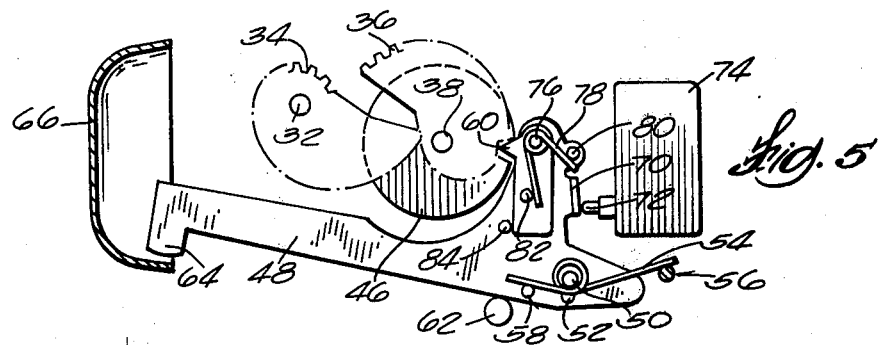
FIG. 5 is similar to FIG. 4 but shows the parts in the "off" position with the striker spaced from the bell.

In the off position depicted in FIG. 5 it will be seen that the non-circular gearing gives a considerable step-up gear ratio to the driven gear 36 and, hence, the cam will have much greater angular movement than the drive gear 34. At the maximum time setting the reverse is true and there is a considerable reduction in the gear ratio giving very little movement of the timing cam compared to the angular movement of the drive gear 34. The gearing has been designed to achieve generally logarithmic speed ratio so that the low end of the timing scale is considerably expanded as compared to the high end and, therefore, the timer can be manually set with substantially the same percentage accuracy throughout its timing range. Very short time intervals in the range of 30 seconds, for example, can be set with reasonable accuracy.

Figure 1:
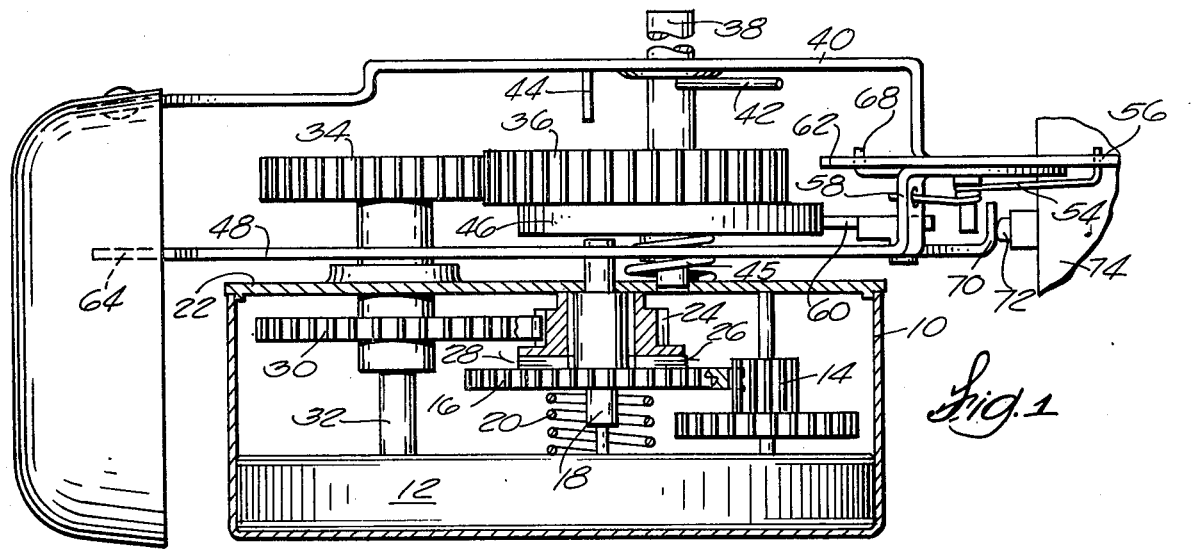
FIG. 1 is a vertical section through the timer showing the parts in normal position.

Lever 48 is pivoted on pin 50 depending from bracket 40. The pin passes through a slot 52 in the lever. Spring 54 is coiled around the pin 50 and has one end hooked into the bracket 40 at 56 (FIG. 1). In FIGS. 4 through 7 for pictorial purposes this point is illustrated as a fixed abutment. The other end of the spring hooks into lever 48 (FIG. 1) at 58. In FIGS. 4 through 7 this is illustrated as an abutment on the lever. The spring force serves two purposes. One is to exert a counterclockwise force on lever 48 which urges the cam follower 60 against the cam 46 and the spring pushes the lever so the upper end (FIGS. 4 through 7) of the slot is held against the pin 50. In FIG. 5 the lever is at rest against stop 62 to keep the striker 64 of lever 48 spaced from the bell 66 which is carried by bracket 40. In the actual construction as illustrated in FIG. 1 the stop 62 is a portion 62 of the bracket 40 which is engaged by an upturned end 68 of a tab projecting from lever 48.

Figure 6:
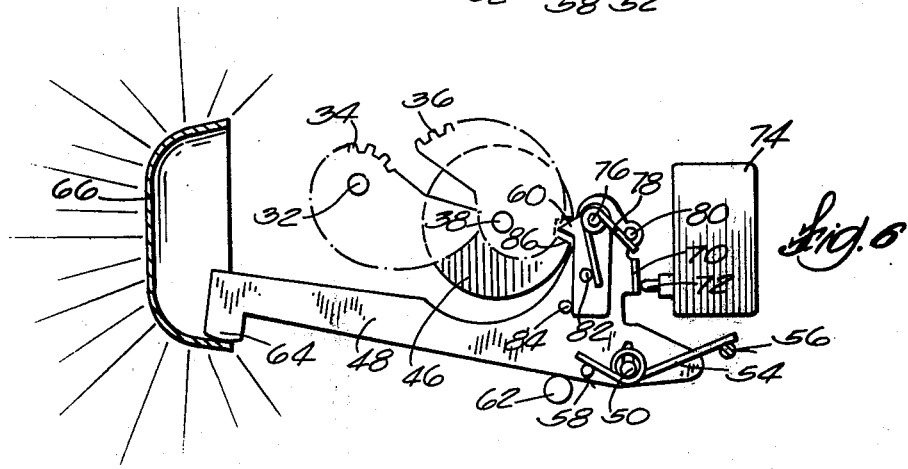
FIG. 6 shows the parts in the position at the moment of striker impact on the bell.
Figure 7:
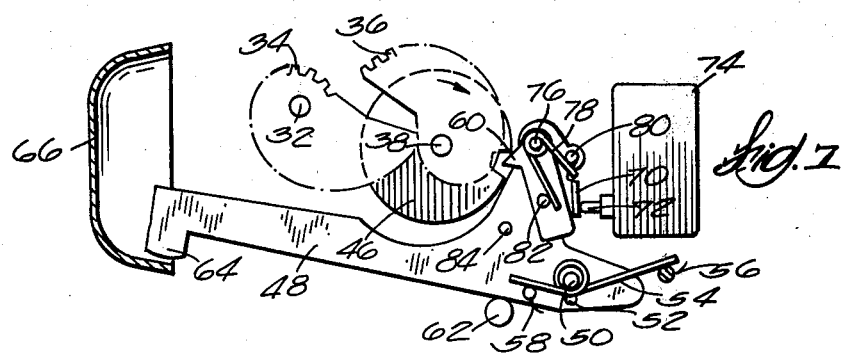
FIG. 7 shows the parts in the positions they occupy as the cam is manually reversed to move towards a set position.

The lever is formed with an upturned ear 70 which actuates plunger 72 of switch 74. The follower 60 is part of a follower arm pivoted on pin 76 fixed on timing lever 48 and biased by spring 78 coiled around the pin and bearing against fixed abutment 80 and pin 82 carried by the follower lever. This biases the follower arm clockwise about pin 76 with the motion of the follower arm limited by abutment of the arm with stop 84 fixed on lever 48. This is the normal position of the follower. The follower 60 is shaped to achieve a snap action when it drops into notch 86 in cam 46. Thus in the position shown in FIGS. 5 and 6 which depict, in effect, the end of the timing cycle the shape of surface 88 of the follower is designed to freely drop down the generally radial drop surface 90 of the notch. By reason of pivoting the follower 60 manual reversal of the cam from the off position to set the timer is easily accomplished. The follower arm can now pivot until it strikes ear 70 in which position the tip of the follower is inclined relative to the corner of the notch so that there is a ramp surface to act on and the cam can easily force the follower out of the notch as depicted in FIG. 7.

Figure 4:
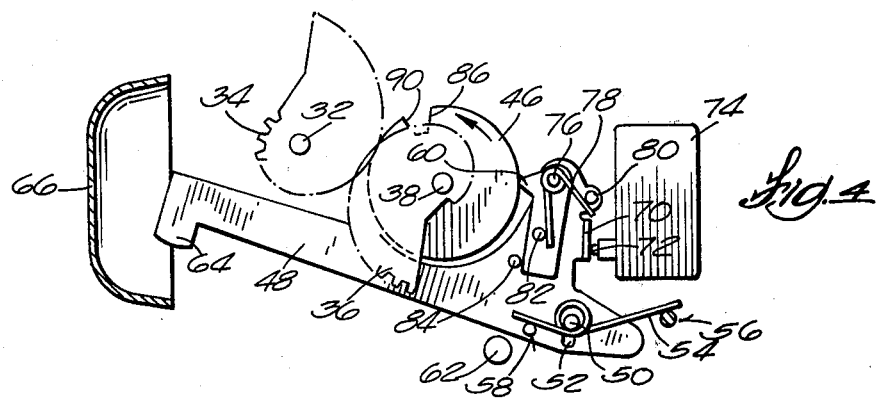
FIG. 4 is a fragmentary, somewhat schematic, view of the timing gears, cam, the timing lever, the bell and switch. The parts are shown in the timing position.

When the timer is set as, for example, in FIG. 4 the switch 74 is actuated to the "on" position and the motor starts operating as does the controlled appliance. The cam rotates in a counterclockwise direction until the drop surface of 90 moves under the follower and allows the follower to drop into the notch 86 with a snap action under the influence of biasing spring 54. This snap action develops considerable momentum in the relatively heavy lever 48 and when the lever impacts on stop 62 the momentum will cause the lever to pivot about the stop 62 and take up the overtravel available through the pin and slot connection of the lever allowing the striker to hit the bell 66 as illustrated in FIG. 6. Immediately after the motion is stopped by reason of the striker hitting the bell the bias of spring 54 moves the lever clockwise about stop 62 and "takes back" the over-travel in the pin and slot connection and returns the lever to the position shown in FIG. 5. This takes the striker off the bell immediately after impact and allows the bell to ring clearly whereas the bell would have a dead sound if the striker stayed on the bell. In practice the striker is desirably spaced from the bell about 1 mm in the position shown in FIG. 5. Since the lever is a stamped part this tolerance is easily maintained with no adjustment required in the assembly process.

We claim:

1. A timer including a support, a housing mounted on the support and enclosing a motor and a reduction gear train the final gear of which is mounted on a drive shaft which projects through the housing, a first non-circular gear mounted on the shaft, a driven shaft parallel to the drive shaft and axially movable between a normal position and a set position, a spring biasing the driven shaft to its normal position, a gear and cam assembly fixed on the driven shaft and including a second non-circular gear and a cam, said non-circular gears being in mesh at all times so the gear ratio from the drive to driven shafts is variable, said cam having an active cam surface and a notch in the surface at the zero position with an abrupt generally radial drop surface at the leading edge of the notch as the cam is driven in a timing direction towards the zero position, clutch means in said gear train operative to disengage the gear train, means operated upon axial movement of the driven shaft to its set position to disengage said clutch means and permit rotation of the cam in the reverse direction opposite said timing direction to a desired position without the drag of the gear train, a lever including a cam follower, means pivotally mounting the lever on the support, a spring biasing the lever to hold the follower against the cam, a switch mounted on the support for actuation by the lever, a bell mounted on the support, said lever including a portion functioning as a striker operative to hit the bell when the follower drops into said cam notch.

2. A timer according to claim 1 including means operative to retract the striker from the bell immediately after it hits the bell to permit the bell to ring.

3. A timer according to claim 2 in which the lever pivot means permits relative lateral movement between the lever and the pivot, a stop engaged by the lever when it drops into said notch and positioned so the lever rocks about the stop due to the momentum of the lever and as permitted by the lateral movement of the lever relative to the pivot, said retracting means being the lever bias spring acting to return the lever to its normal position relative to the pivot.

4. A timer according to claim 1 in which the follower is pivoted in the lever, a spring acting on the follower to urge it to its normal operative position in which it can drop into the notch with a snap action, the fast drop surface of the notch acting on the follower when the cam is turned in its reverse direction to pivot the follower to a position in which the follower is inclined relative to the drop surface sufficiently to force the follower out of the notch.

5. A timer according to claim 1 in which the clutch means comprises a shaft in the housing projecting through the housing and having a large gear fixed thereon and a spring biasing the shaft to project outwardly from the housing, a pinion rotatably mounted on the shaft and engaging the final gear of the gear train, face clutch members on confronting surfaces of the large gear and the pinion gear for engagement when the spring forces the large gear towards the pinion and disengagement when the projecting shaft is moved inwardly against the bias of said spring, said projecting shaft being engaged by said assembly when the driven shaft is moved axially to its set position.

6. A timer including a housing and a motor in the housing driving a final gear through reduction gearing, the final gear being mounted on a drive shaft projecting from the housing, a first non-circular gear mounted on the shaft, a driven shaft parallel to the drive shaft and mounted for rotary and axial movement between a normal position and a set position, a spring biasing the driven shaft to its normal position, a second non-circular gear mounted on the driven shaft and meshing with the first non-circular gear so the gear ratio is variable, a cam mounted on the driven shaft and having a notch at the zero time position of the cam, the notch having a generally radial drop surface, a lever pivotally mounted adjacent the cam and having a follower engaging the cam, a spring biasing the lever to hold the follower against the cam, a switch mounted adjacent the lever for actuation by the lever, a bell, said lever including a rigid striker portion which is spaced from the bell in the off position and in the timing position of the lever, and means causing momentary overtravel of the striker when the follower drops into the cam notch with abrupt motion so the striker impacts the bell and withdraws from the bell.

7. A timer according to claim 6 in which the lever is pivotally mounted on a pivot and is provided with a slot receiving the pivot and the spring acting on the lever moves the lever so the pin engages one end of the slot and said causing means is a stop engaged by the lever at the end of the drop of the follower into the notch whereby the momentum causes the lever to pivot about the stop as permitted by the pin and slot pivot for the lever.

8. A timer according to claim 6 including clutch means in said reduction gearing operated in response to axial movement of said driven shaft to its set position to disengage to thereby reduce the drag during setting.

9. A timer according to claim 8 in which the follower is pivoted on the lever for movement to a position in which it presents an inclined surface to the cam notch during manual movement of the cam from the zero position.

10. A timer according to claim 9 including a spring biasing the follower to its normal position in which its active face is generally parallel to the drop surface of the cam notch.

* * * * *